United States Patent
Lind

(10) Patent No.: US 12,149,530 B2
(45) Date of Patent: *Nov. 19, 2024

(54) DEVICE RISK LEVEL BASED ON DEVICE METADATA COMPARISON

(71) Applicant: OKTA, INC., San Francisco, CA (US)

(72) Inventor: Stephen Woodward Lind, El Cerrito, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/348,962

(22) Filed: Jul. 7, 2023

(65) Prior Publication Data

US 2023/0353566 A1   Nov. 2, 2023

Related U.S. Application Data

(63) Continuation of application No. 17/814,792, filed on Jul. 25, 2022, now Pat. No. 11,736,480, which is a (Continued)

(51) Int. Cl.
*H04L 29/00* (2006.01)
*H04L 9/40* (2022.01)

(52) U.S. Cl.
CPC ...... *H04L 63/0876* (2013.01); *H04L 63/0838* (2013.01); *H04L 63/0853* (2013.01); *H04L 63/1433* (2013.01); *H04L 63/20* (2013.01)

(58) Field of Classification Search
CPC ............ H04L 63/0876; H04L 63/0838; H04L 63/0853; H04L 63/1433; H04L 63/20;
(Continued)

(56) References Cited

U.S. PATENT DOCUMENTS 9,652,597 B2 *   5/2017   Roundy .............. G06Q 10/10
9,686,259 B2 *   6/2017   Chaudhri ............ H04L 67/104
(Continued)

FOREIGN PATENT DOCUMENTS

CN   110535877 A   12/2019
EP   2438547 B1   4/2012
(Continued)

OTHER PUBLICATIONS

PCT International Search Report and Written Opinion, PCT Application No. PCT/US2021/057713, Feb. 18, 2022, nine pages.

*Primary Examiner* — Don G Zhao
(74) *Attorney, Agent, or Firm* — Holland & Hart LLP

(57) ABSTRACT

An authentication system determines a risk level for a client device impersonating a client device enrolled in authentication services by comparing device metadata for the impersonating client device to device metadata for the enrolled client device. As part of enrolling the enrolled client device, the authentication system associates one or more authentication credentials with the enrolled client device. In order to authenticate access requests associated with a client device identified as the enrolled client device, the authentication system obtains an authentication token from the client device generated using the authentication credentials and also obtains device metadata corresponding to the client device. Based on the device metadata comparison during authentication, the authentication system detects device metadata anomalies and uses detected device metadata anomalies to determine a risk level for the client device. Based on the risk level, the authentication system authorizes or denies the client device from accessing requested services.

20 Claims, 5 Drawing Sheets

Related U.S. Application Data continuation of application No. 17/087,639, filed on Nov. 3, 2020, now Pat. No. 11,457,012.

(58) Field of Classification Search
CPC .......... H04L 63/1466; H04L 63/0807; H04W 12/122; H04W 12/67
See application file for complete search history.

(56) References Cited

U.S. PATENT DOCUMENTS

| | | | |
|---|---|---|---|
| 9,686,296 B1* | 6/2017 | Murchison | H04L 63/08 |
| 10,237,240 B2* | 3/2019 | Phillips | H04L 63/0263 |
| 10,284,567 B2* | 5/2019 | Todasco | H04L 63/0853 |
| 10,366,218 B2* | 7/2019 | Blanke | G06Q 20/425 |
| 10,521,590 B2* | 12/2019 | Kandala | H04L 63/20 |
| 10,609,070 B1* | 3/2020 | Farmer, III | H04L 63/126 |
| 10,846,385 B1* | 11/2020 | Walters | G06F 21/40 |
| 10,972,465 B1* | 4/2021 | Bendersky | H04L 63/10 |
| 11,106,442 B1* | 8/2021 | Hsiao | H04L 67/02 |
| 11,140,553 B1* | 10/2021 | Taylor | H04W 12/122 |
| 11,240,255 B1* | 2/2022 | Amin | H04L 63/04 |
| 11,277,426 B1* | 3/2022 | Kazemeyni | H04L 63/1416 |
| 11,290,439 B1* | 3/2022 | DePue | H04W 12/084 |
| 11,418,486 B2* | 8/2022 | Mundilla Garcia | H04W 12/08 |
| 11,457,012 B2 | 9/2022 | Lind | |
| 2011/0289588 A1* | 11/2011 | Sahai | G06Q 90/00 726/25 |
| 2013/0283356 A1* | 10/2013 | Mardikar | H04L 63/08 726/4 |
| 2015/0304110 A1* | 10/2015 | Oberheide | H04L 9/3215 713/155 |
| 2016/0173513 A1* | 6/2016 | Rohde | H04L 63/126 726/23 |
| 2016/0261482 A1* | 9/2016 | Mixer | H04L 43/12 |
| 2018/0048658 A1* | 2/2018 | Hittel | G06F 21/565 |
| 2018/0212970 A1* | 7/2018 | Chen | H04L 9/3236 |
| 2018/0239898 A1* | 8/2018 | Haerterich | G06F 21/577 |
| 2018/0295149 A1* | 10/2018 | Gazit | H04L 63/1416 |
| 2019/0208014 A1* | 7/2019 | Goldberg | G06F 16/1827 |
| 2020/0044830 A1 | 2/2020 | Gargett et al. | |
| 2020/0082065 A1 | 3/2020 | Harding et al. | |
| 2020/0252422 A1* | 8/2020 | Davis | H04L 63/102 |
| 2020/0280551 A1* | 9/2020 | Wallrabenstein | H04L 63/0428 |
| 2020/0280751 A1 | 9/2020 | Cronk et al. | |
| 2020/0358804 A1* | 11/2020 | Crabtree | H04L 63/1433 |
| 2021/0096541 A1* | 4/2021 | Sayyarrodsari | H04W 4/38 |
| 2021/0136089 A1* | 5/2021 | Costea | G06F 21/56 |
| 2021/0168173 A1* | 6/2021 | Compton | H04L 63/1416 |
| 2021/0258329 A1* | 8/2021 | Clayton | H04L 63/0876 |
| 2021/0297443 A1* | 9/2021 | Crabtree | G06F 16/2474 |
| 2021/0352099 A1* | 11/2021 | Rogers | G06N 20/00 |
| 2021/0375392 A1* | 12/2021 | Polcari | G16B 40/20 |
| 2021/0392154 A1* | 12/2021 | Waplington | G06N 5/04 |
| 2021/0400063 A1* | 12/2021 | Tackabury | H04L 69/16 |
| 2022/0100857 A1* | 3/2022 | Filar | G06N 5/01 |
| 2022/0138402 A1* | 5/2022 | Kraus | G06N 3/08 715/269 |
| 2022/0141220 A1* | 5/2022 | Lind | H04L 63/0838 726/1 |
| 2022/0360581 A1 | 11/2022 | Lind | |

FOREIGN PATENT DOCUMENTS

| | | | |
|---|---|---|---|
| EP | 3151505 A1 | 4/2017 | |
| WO | WO-2022098647 A1 | 5/2022 | |

* cited by examiner

DEVICE RISK LEVEL BASED ON DEVICE METADATA COMPARISON

CROSS-REFERENCE TO RELATED APPLICATIONS

This application is a continuation of and claims priority to U.S. patent application Ser. No. 17/814,782, filed on Jul. 25, 2022, which is a continuation of U.S. patent application Ser. No. 17/087,639, now U.S. Pat. No. 11,457,012, filed on Nov. 3, 2020, the content of each of which is incorporated herein by reference in its entirety.

FIELD OF ART

The present invention generally relates to the field of software applications, and more specifically, to denying authentication for client devices with anomalous metadata.

BACKGROUND

Authentication systems often attempt to determine a risk level for client devices to authenticate requests for access to services (e.g., during multi-factor authentication (MFA)) in order to deny access to malicious client devices (i.e., client devices operated by malicious users). For example, authentication systems may determine a risk level for a client device based on information describing the client device, such as applications installed on the device or network activity of the device, etc. Authentication systems may further use these risk levels in order to deny malicious devices which otherwise provide correct authentication information (e.g., passwords, multi-factor authentication tokens, etc.) from accessing requested services or resources.

Conventional authentication systems determine risk levels for client devices based on risk factors that can be determined from an isolated snapshot of device information available for the client device at the time of authentication (e.g., detecting the presence of malware on the client device). Furthermore, determining such inherent risk factors can require complex analysis that often results in false positives (i.e., risk levels incorrectly indicating a client device is a malicious client device). Additionally, conventional systems rely on disjoint processes for authenticating access requests for a client device and determining a risk level for the client device. For example, conventional systems may use a process for determining a risk level that is separate from an authentication processes, such as using an external third-party risk vendor that periodically determines a risk level for a client device. As such, conventional systems can exhibit a lag time between authentication of access requests and determining a risk level, resulting in access requests associated with high risk devices being successfully authenticated for some period of time before the separate process determines a risk level. Still other conventional systems rely on information that can be spoofed by malicious devices, or which users can choose not to provide, such as a geographic position of a client device. As such, improved techniques determining device risk levels for authentication are needed.

SUMMARY

An authentication system determines a risk level for a client device impersonating a client device enrolled in authentication services (e.g., malicious devices) by comparing device metadata for the impersonating client device to device metadata for the enrolled client device. As part of enrolling the enrolled client device, the authentication system associated one or more authentication credentials (e.g., a multi-factor authentication (MFA) key) with the enrolled client device. In order to authenticate access requests associated with a client device identified as the enrolled client device, the authentication system obtains an authentication token from the client device generated using the authentication credentials and obtains device metadata corresponding to the client device. For instance, the authentication system may receive an authentication token from the client device signed using the authentication credentials and the device metadata. Based on the device metadata comparison during authentication, the authentication system detects device metadata anomalies and uses detected device metadata anomalies to determine a risk level for the client device. The risk level indicates whether or not the client device is impersonating the enrolled client device (e.g., a malicious client device that cloned authentication credentials for the enrolled client device). Based on the risk level, the authentication system authorizes or denies the access request associated with the client device.

In some embodiments, an authentication system associates authentication credentials and first device metadata with a first client device during an enrollment process for authenticating access requests. In response to an access request associated with a second client device impersonating the first client device, the authentication system obtains an authentication token generated using the authentication credentials and second device metadata describing one or more infrequently changing characteristics of the second client device. The authentication system compares the first device metadata to the second device metadata in order to detect device metadata anomalies. Based on the comparison, the authentication system determines a risk level for the second client device, the risk level indicating a likelihood that the second client device is not the first client device. Based on the risk level, the authentication system and denies the second access request based on the risk level.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
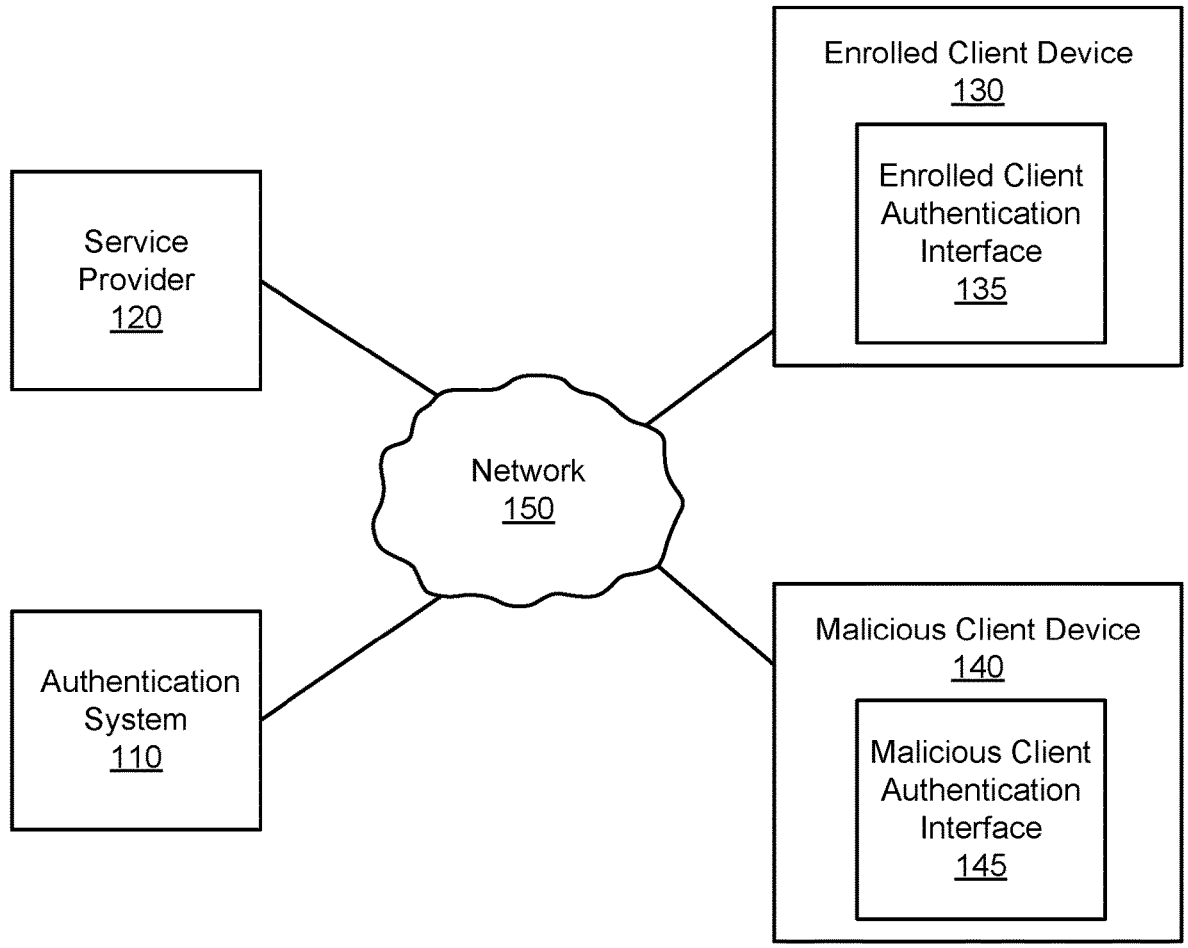
FIG. 1 is a block diagram illustrating a computing environment for authenticating a client device by determining a risk level for the client device using device metadata, according to one embodiment.

FIG. 1 is a block diagram illustrating one embodiment of a computing environment 100 for authenticating a client device by determining a risk level for the client device using device metadata. In the embodiment shown, the computing environment 100 includes an authentication system 110 that provides authentication for enrolled client devices, a service provider 120 that provides services to the enrolled client devices that are authenticated by the authentication system 110, an enrolled client device 130 that is enrolled in authentication services of the authentication system 110, and a network 150 that enables communication between the various components of FIG. 1. Additionally, FIG. 1 illustrates a malicious client device 140 that impersonates the enrolled client device 130 in requesting authentication by the authentication system 110. In some embodiments, a user of the enrolled client device 130 is a member of an organization (e.g., an employee of a corporation) that contracts with the authentication system 110 to handle authentication on behalf of the members of the organization to access services of the service provider 120, which can include internal services of the organization (e.g., an enterprise network or suite of applications) or third-party services used by the organization. Example third-party services include SALESFORCE, MICROSOFT OFFICE 365, SLACK, DOCUSIGN, ZOOM, or the like. In different embodiments, the computing environment 100 and its components may include different or additional elements than those illustrated in FIGS. 1-2. Furthermore, the functionality may be distributed among the elements in a different manner than described. The components of FIG. 1 are now described in more detail.

The authentication system 110 authenticates requests for access to services of the service provider 120. In particular, the authentication system 110 uses a client device that is enrolled in authentication services with the authentication system 110 (e.g., the enrolled client device 130) in order to authenticate requests for services associated with the enrolled client device. The authentication system 110 may be an authentication platform providing various authentication services for accessing services of service providers, such as single sign-on capabilities, multi-factor authentication (MFA), identity proofing, application programming interface access management, or other authentication services. During enrollment of a client device 130 the client device 130 generates enrollment information including authentication credentials of the client device and provides some or all of the enrollment information to the authentication system 110. Authentication credentials are data values used by an enrolled client device that enable the enrolled client device to prove its identity to the authentication system 110. For example, authentication credentials can include various hardware security tokens, software security tokens, security keys (e.g., a shared secret key, a private key, etc.), authentication certificates, other authentication credentials, or any combination thereof. For example, the client device 130 may generate an authentication certificate including a shared key or public/private encryption key pair and provide the public key or shared key to the authentication system 110. Enrollment information can additionally include other information used by the authentication system 110 to authenticate the enrolled client device 130, such as information describing a user associated with the enrolled client device 130 (e.g., name, age, email, etc.) or various authentication factors (e.g., passwords, secret questions, etc.). The enrolled client device 130 can use the authentication credentials to authenticate requests to access services of a service provider associated with the enrolled client device 130 (i.e., "access requests") through the authentication system 110.

Furthermore, the authentication system 110 determines a risk level for client devices associated with access requests using device metadata corresponding to the client devices. In particular, the authentication system 110 determines a risk level by comparing device metadata for a client device associated with a current access request to device metadata for an enrolled client device to detect device metadata anomalies. As used herein, a risk level is information indicating a likelihood that a client device used for authentication of an access request is impersonating an enrolled client device. A risk level may be one of a set of predefined risk levels (e.g., low risk, medium risk, high risk, etc.) or a numerical value, such as a score or likelihood value (e.g., 0.6 or 60% likelihood). Device metadata anomalies are discrepancies between device metadata corresponding to one access request associated with authentication credentials of an enrolled client device and device metadata corresponding to another access request associated with the same authentication credentials. In particular, as part of authenticating an access request received from a client device using authentication credentials of the enrolled client device 130, the authentication system 110 receives or otherwise obtains device metadata corresponding to the client device requesting access. The authentication system 110 compares the device metadata for the client device requesting access to stored device metadata for the enrolled client device 130. Based on the comparison, the authentication system 110 may detect device metadata anomalies for device metadata values of the same type from the current device metadata and the stored device metadata. Based on detection of device metadata anomalies, the authentication system 110 determines a risk level for the client device and uses the risk level to determine whether to authorize or deny the access request. In some embodiments, the authentication system 110 asks for additional information from the client device or another computer device associated with an access request based on the risk level, such as a medium risk level.

Device metadata values describe physical hardware or software characteristics of a client device. In particular, the physical hardware or software characteristics described by device metadata values are characteristics that are change infrequently, and are therefore unlikely to have changed between access requests received from an enrolled client device. For example, device metadata values can include an operating system (OS) version, screen size, processor count, model, manufacturer, serial number, international mobile equipment identity (IMEi), cellular radio type, subscriber identity module (SIM) card identifier, disk capacity, physical memory capacity, user interface type (e.g., iPad, iPhone, Mac, etc.). Similarly, device metadata anomalies can include discrepancies between device metadata values of the same type, such as an OS version downgrade (e.g., iOS 13.2.1 to 13.1.1), a screen size change (e.g., "4.2" to 5.0"), a processor count change (e.g., 1 to 2), etc. Detection of device metadata anomalies is described in greater detail below with reference to FIGS. 2-4.

The service provider 120 provides services in response to access requests authenticated by the authentication system 110. As described above with reference to the system environment 100, in some embodiments the service provider 120 provides access to internal services of an organization of which a user of the enrolled client device 130 is a member. In the same or different embodiments, the service provider 120 provides access to services of one or more third-party service providers. The service provider 120 communicates with the authentication system 110 to authenticate users of the service provider 120. In embodiments, the service provider 120 receives authentication responses from the authentication system 110 including information indicating whether or not an access request was successfully authenticated. Based on the received authentication responses, the service provider 120 determines whether or not to provide services to a source of an access request (e.g., the enrolled client authentication interface 135, as described below). In some embodiments, the authentication system 110 is a component of the service provider 120.

In some embodiments, service providers provide one or more custom authentication policies to the authentication system 110. Authentication policies for a service provider (e.g., the service provider 120) describe how authentication should be performed by the authentication system 110 for access requests directed to the service provider. In particular, authentication policies can define how risk levels for a client device that provides an access request should be determined. Additionally, or alternatively, authentication policies can define how the authentication system 110 should use a determined risk level for authenticating an access request. For example, an authentication policy may include a risk tolerance threshold indicating the highest acceptable risk level for which an access request can be authorized by the authentication system 110. The authentication system 110 may provide an interface to client systems for configuring the authentication policies, such as a user interface or an application programming interface (API). Using authentication policies for determining or interpreting risk levels for client devices is described in greater detail below with reference to FIG. 2.

The enrolled client device 130 is a computing device that is enrolled with the authentication system 130 to be used for authentication requests to access services of the service provider 120 from a source associated with the enrolled client device 130. For instance, the enrolled client device 130 can be a desktop computer, a laptop computer, a mobile device (e.g., a mobile phone, a tablet, etc.), or any other suitable device. In embodiments, the enrolled client device 130 receives enrollment information from the authentication system 110, including authentication credentials to use for authenticating access request associated with the enrolled client device 130 through the authentication system 110, which are stored on the client device 130. The enrolled client device 130 has corresponding device metadata, as described above with reference to the authentication system 110. The enrolled client device 130 can provide some or all of the device metadata to the authentication system 110 as part of authenticating an access request from the enrolled client device 130. Some or all of the communication between the enrolled client device 130 and the authentication system 110 may be facilitated by software associated with the authentication system 110 on the enrolled client device 130 (e.g., a client-side authentication application or process authored by the same organization responsible for the authentication system 110). In this case, the software associated with the authentication system 110 may obtain some or all of the device metadata for the enrolled client device 130 through corresponding system calls to an operating system (OS) of the enrolled client device 130. Although only one enrolled client device 130 is depicted in FIG. 1, the computing environment 100 can include any number of enrolled or non-enrolled client devices.

The enrolled client device 130 includes the enrolled client authentication interface 135. The enrolled client authentication interface 135 is an interface for accessing services of the service provider 120. For instance, the enrolled client authentication interface 135 may be a mobile application, a web browser, an application programming interface (API), or some other interface for accessing services of the service provider 120. As an example, a user of the enrolled client device 130 may submit an access request through the client authentication interface 135 to be authenticated by the authentication system 110. In this case, the authentication system 110 may authenticate the access request by obtaining an authentication token and device metadata from the enrolled client device 140, such as in order to obtain one or more authentication factors. Although the enrolled client authentication interface 135 is included on the enrolled client device 130 as depicted in FIG. 1, the enrolled client authentication interface 135 may be accessed on any appropriate computing device. For example, the enrolled client device 130 may be a mobile device associated with a user that provides an access request on a desktop computer and uses the enrolled client device 130 to authenticate the access request, e.g., by providing an appropriate one-time MFA token.

In some embodiments, the enrolled client devices 130 securely stores authentication credentials on a cryptographic microprocessor of the enrolled client devices 140, such as a trusted platform module (TPM). In these embodiments, the cryptographic microprocessor may use a variety of cryptographic algorithms to encrypt the authentication credentials, such as the Rivest-Shamir-Adleman (RSA) algorithm, the secure hash algorithm I (SHAI), Hash based Message Authentication Code (HMAC), or the Elliptic Curve algorithm. As part of securely storing the authentication credentials in the cryptographic microprocessor, the enrolled client device 130 and the authentication system 110 may exchange encryption information (e.g., public keys of a public/private key pair) to enable the enrolled client device 130 to confirm its identity to the authentication system 110.

The malicious client device 140 is a computing device that a malicious user uses to impersonate the enrolled client device 130 for authenticating access requests associated with the malicious client device 140 by the authentication system 110. For example, the malicious client device 140 may provide identification data to the authentication system 110 during authentication corresponding to the enrolled client device 130. As with the enrolled client device 130, the malicious client device 140 can be a desktop computer, a laptop computer, a mobile device (e.g., a mobile phone, a tablet, etc.), or any other device suitable to execute the authentication client application 125. In embodiments, the malicious client device 140 obtains authentication credentials from the enrolled client device 130. For example, the malicious client device 140 may obtain a cloned copy of the authentication credentials of the enrolled client device 130 directly or indirectly through various security attacks, such as a device cloning attack or man-in-the-middle attack. Because the malicious client device 140 is a different physical device than the enrolled client device 130, various device metadata for the malicious client device 140 may differ from device metadata of the enrolled client device 130. As such, the authentication system 110 may detect device anomalies for device metadata received from the malicious client device 140 generated using the authentication credentials of the enrolled client device 130, even when the malicious client device 140 has obtained an identical copy of authentication credentials of the enrolled client device 130. Similar to the enrolled client device 130, some or all of the communication between the malicious client device 140 and the authentication system 110 may be facilitated by software associated with the authentication system 110 on the malicious client device 140. Although only one malicious client device 140 is depicted in FIG. 1, the computing environment 100 can include any number of malicious client devices.

The malicious client device 140 includes the malicious client authentication interface 145. Similarly to the enrolled client authentication interface 135, the malicious client authentication interface 145 is an interface for accessing services of the service provider 120. For instance, the malicious client authentication interface 145 may be a mobile application, a web browser, an application programming interface (API), or some other interface for accessing services of the service provider 120. Additionally, the malicious client authentication interface 145 directs the authentication system 110 to request an authentication token from the malicious client device 140 rather than the enrolled client device 145. As with the client authentication interface 135, although the malicious client authentication interface 145 is included on the malicious client device 140 as depicted in FIG. 1, the malicious client authentication interface 145 may be accessed on any appropriate computing device.

The network 150 connects the authentication system 110, the service provider 120, the enrolled client devices 130, and the malicious client device 140. The network 150 may be any suitable communications network for data transmission. In an embodiment such as that illustrated in FIG. 1, the network 150 uses standard communications technologies or protocols and can include the internet. In another embodiment, the entities use custom or dedicated data communications technologies.

Figure 2:
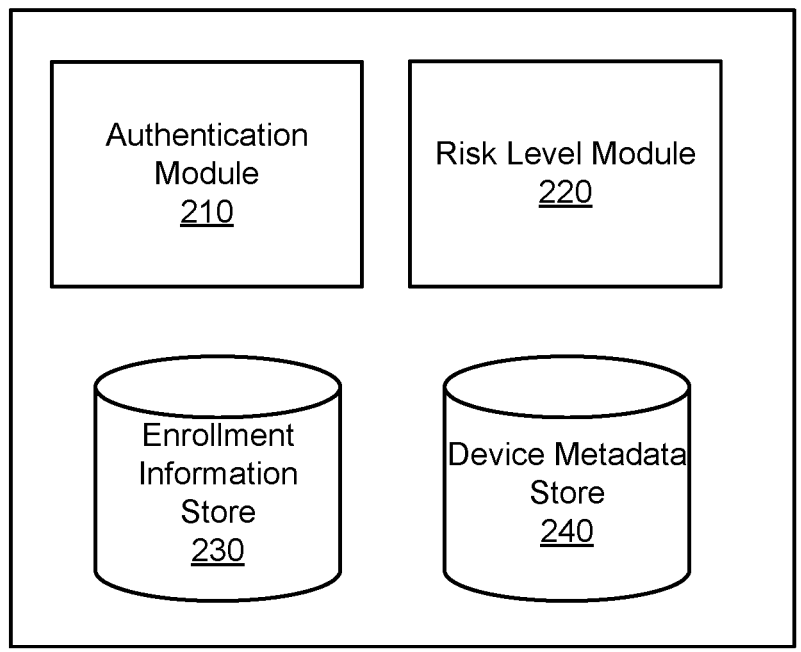
FIG. 2 is a block diagram illustrating one embodiment of the authentication system, according to one embodiment.

FIG. 2 is a block diagram illustrating one embodiment of the authentication system 110. In the embodiment shown, the authentication system 110 includes an authentication module 210 that authenticates enrolled client devices, a risk level module 220 that determines a risk level for client devices associated with access requests using device metadata, an enrollment information store 230 that stores authentication information for enrolled client devices, and a device metadata store 240 that stores device metadata. The components of FIG. 2 are now described in more detail.

The authentication module 210 authenticates access requests for access to services (e.g., services of the service provider 120) using enrolled client devices (e.g., the enrolled client device 130). In embodiments, the authentication module 210 enrolls client devices to be used for authenticating access requests associated with the enrolled client devices. In particular, the authentication module 210 associates enrollment information with the enrolled client device 130 (e.g., stored in the enrollment information store 230). The enrollment information associated with an enrolled client device 130 can include authentication credentials (e.g., a public encryption key) generated by the enrolled client device 130 and provided to the authentication system 110. The authentication module 210 may further receive or otherwise obtain device metadata for a client device during enrollment of the client device and associate the device metadata with the enrollment information for the client device. The authentication module 210 may enroll a client device in authentication services in response to receiving an enrollment request from the client device. After enrolling a client device 130 in authentication services, the authentication module 210 receives requests to access services that are associated with the enrolled client device 130 (e.g., provided by a user of the enrolled client device 130 on the enrolled client device 130 or on another computing device). The authentication module 210 uses the enrolled client device 130 to authenticate the access request, such as requesting authentication information (e.g., an MFA factor) from the enrolled client device 130 (e.g., via an MFA push challenge) generated using authentication credentials to authenticate the client devices 130.

The authentication module 210 further communicates with the risk level module 220 as part of authenticating an access request in order to determine a risk level for the client device that provided the access request. The authentication module 210 uses the risk level to determine whether to grant or deny an access request. If the authentication module 210 determines the client device is not an enrolled client device associated with the authentication credentials based on the risk level (e.g., the risk level exceeds a numerical threshold), the authentication module 210 denies the access request. For example, the authentication module 210 may determine that an authentication token received from the malicious client device 140 is valid (given that it was generated using cloned authentication credentials), but still deny an access request based on a computed risk level for the malicious client device. Furthermore, in addition to denying the access request, the authentication module 210 may take various other security measures, such as notifying the enrolled client device or adding the impersonating client device to a list of blocked client devices. Alternatively, if the authentication module 210 determines that the client device is the enrolled client device based on the risk level, the authentication module 210 may grant the access request (e.g., if the authentication token is otherwise successfully authenticated). For example, the authentication module 210 may provide an authentication response to a computing device that provided the access request including authorized information that can be used to access the requested services at the service provider 120 (e.g., an authorization token).

In some embodiments, the authentication module 210 provides an authentication key to the enrolled client device 130 during enrollment to use for signing a payload of authentication related data to generate authentication tokens, such as authentication credentials, client device metadata, or other authentication-related parameters (e.g., a current time or geographic location of the enrolled client device 130). The authentication keys may be a secret key shared between the enrolled client device and the authentication system 110, such as a secret key for generating a hash-based message authentication code (HMAC). In this case, the authentication module 210 may authenticate the access request by accessing the payload of the authentication token using the shared secret key. For example, the authentication system 110 may provide a Javascript Object-Notation (JSON) web key to the enrolled client device 130, in which case the enrolled client device 130 can use the JSON web key to generate a JSON web token for authentication by the authentication system 110. As another example, the authentication keys may be a public/private key pair generated by the enrolled client device 130, where the public key is provided to the authentication module 210. The enrolled client device 130 may also include device metadata in the payload signed using the authentication key to generate the authentication token. The malicious client device 140 may obtain a cloned copy of the authentication key directly or indirectly from the enrolled client device 130, and thereafter use the authentication key to generate authentication tokens provided to the authentication module 210.

In some embodiments, the authentication module 210 authenticates access requests using multi-factor authentication (MFA). In this case, the authentication module 210 obtains the authentication tokens as part of an MFA authentication process, such as to obtain an initial authentication factor, a secondary authentication factor, a tertiary authentication factor, etc. As an example, the authentication token may be provided to the authentication module 210 in response to an MFA push challenge from the authentication module 210 to a client device. As another example, the authentication token may be provided to the authentication module 210 as a one-time password. In this case, the authentication module 210 may use various one-time password techniques to authenticate an access request, such as an HMAC-based on time password (HOTP) algorithm or a time-based one-time password (TOTP) algorithm. For instance, software associated with the authentication system 110 on the enrolled client device 130 may generate a one-time password using authentication credentials of the enrolled client device 130 and provide the one-time password for display on the enrolled client device 130 so that a user can input the password for submission to the authentication module 210. In one embodiment, the authentication module 210 determines a risk level for a client device that provides an access request before a one-time password is generated by the client device. In this case, the authentication module 210 may instruct the client device to generate or display the one-time password if the risk level indicates that the client device is not impersonating an enrolled client device (e.g., the malicious client device 140). Otherwise, the authentication module 210 may deny the access request before the one-time password is generated or displayed.

The authentication module 210 may further solicit various other authentication factors from a client device. Examples of other authentication factors include other possession factors (e.g., software tokens) user knowledge factors (e.g., passwords, secret question answer, etc.), inherent factors (e.g., biometric data for a user of the client device), location-based factors (e.g., a GPS coordinate of the client device 130), or any other MFA authentication factor.

The risk level module 220 determines a risk level for client devices associated with access requests for authentication to the authentication module 210 using device metadata corresponding to the client devices. In embodiments, the risk level module 220 receives device metadata corresponding to a client device associated with an access request provided to the authentication system 110 for authentication, such as from the authentication module 210. In order to determine whether there are any device metadata anomalies for the device metadata of the client device associated with the current access request, the risk level module 220 compares the current device metadata to stored device metadata previously received or otherwise obtained from an enrolled client device (e.g., stored in the device metadata store 240) associated with the same access credentials. For instance, the risk level module 220 may compare the current device metadata to device metadata included in enrollment information that is associated with the same user or client device as the current access request. The risk level module 220 may periodically update device metadata included in enrollment information for an enrolled client device, such as after successfully authenticating an access request associated with the enrolled client device. In this case, the stored device metadata compared to the device metadata for the current access request may correspond to the most recent successfully authenticated access request, the most recent successfully authenticated request with the lowest likelihood of device metadata anomalies, some other previous access request, or some combination thereof.

If the risk level module 220 detects one or more device metadata anomalies based on the comparison, the risk level module 220 analyzes the detected device metadata anomalies in order to determine a risk level for client device that provided the current access request. For example, if the risk level module 220 does not detect any device metadata anomalies, the risk level module 220 may assign a risk level to the client device indicating no risk. Conversely, if the risk level module 220 does detect one or more device metadata anomalies, the risk level module may assign a risk level to the client device indicating low to high risk, such as based on the number or type of device metadata anomalies detected. The risk level module 220 provides the result of this determination (e.g., the client device is the enrolled client device or is a malicious client device) to another component of the authentication system 110, such as the authentication module 210.

In some embodiments, the risk level module 220 uses a rule-based technique to determine risk levels for client devices. In this case, the risk level module 220 may associate one or more rules with each type of device metadata value. In particular, the one or more rules associated with a type of device metadata value define how a device metadata anomaly is determined by comparing device metadata values of the type (e.g., any discrepancy between the values, a discrepancy above a threshold, etc.) or a contribution of a device metadata anomaly for device metadata values of the type to a risk level. For instance, the risk level module 220 may use values associated with detected device metadata anomalies to determine a risk level for a client device. Values associated with a detected device metadata anomaly may include a value quantifying a detected discrepancy or weights for the particular type of device metadata anomaly. For example, operating system anomalies may have a high weight and operating system software version anomalies may have a low weight. The risk level module 220 may further use a risk level function that takes values associated with detected device metadata anomalies as input to determine a numerical risk level (e.g., 0.0 for no risk, 0.5 for moderate risk likelihood, 0.9 for high risk likelihood, etc.). In this case, the risk level module 220 may map a numerical risk level to one of a set of predefined risk levels (e.g., 0.0 for no risk, 0.1-0.5 for moderate risk, 0.5-0.9 for high risk, etc.). Furthermore, the one or more rules used by the risk level module 220 to determine a risk level for a client device requesting access to a particular service provider (e.g., the service provider 120) may be defined by an authentication policy for the service provider, as described above with reference to the service provider 120. For example, an authentication policy for a service provider may include rules indicating what types of device metadata values should be used to determine a risk level, how different types of device metadata values should be weighted, or how numerical risk levels should be converted to a set of predefined risk levels.

In some embodiments, the risk level module 220 uses one or more machine learning techniques to determine risk levels for client devices. In this case, the risk level module 220 may train a risk level model to predict a risk level for a client device given device metadata for the client device and stored device metadata from an enrolled client device (e.g., device metadata included in enrollment information associated with the access request) as input. The risk level module 220 may train the risk level model by using a training data set consisting of pairs of device metadata sets including a first set of device metadata representing a client device associated with an access request to be authorized and a second set of device metadata representing a stored device metadata for an enrolled client device. Each pair of device metadata sets in the training set can be labeled as non-malicious (e.g., the access requests both originate from the same enrolled device) or malicious (e.g., the current access request originates from a malicious client device). The risk level module 220 may obtain the training data set in full or part from an organization associated with the enrolled client devices (e.g., devices associated with the employees of a company), such as information for deactivated client devices. Like the rule-based techniques described above, the risk level module 220 may determine a risk level using a risk level model based in part on an authentication policy associated with a service provider, such as how to interpret a numerical risk level output by the risk level model.

In embodiments using machine learning techniques, the risk level module 220 can use various machine learning or other statistical techniques to determine a risk level for a client device based on device metadata. These techniques can include supervised neural networks (e.g., convolutional neural networks), support vector machines, linear regression, logistic regression, decision trees, and any other supervised learning technique usable to train a model to predict a risk level for client devices. These techniques can also include unsupervised neural networks (e.g., autoencoders, adversarial networks, etc.), k-means clustering, principal component analysis, and any other unsupervised learning technique usable to train a model to predict a risk level for client devices using one or more device signals. In various embodiments, the risk level module 220 uses one or more machine learning techniques described above to train a machine learning pipeline including one or more models configured to predict a risk level for client devices.

Figure 3:
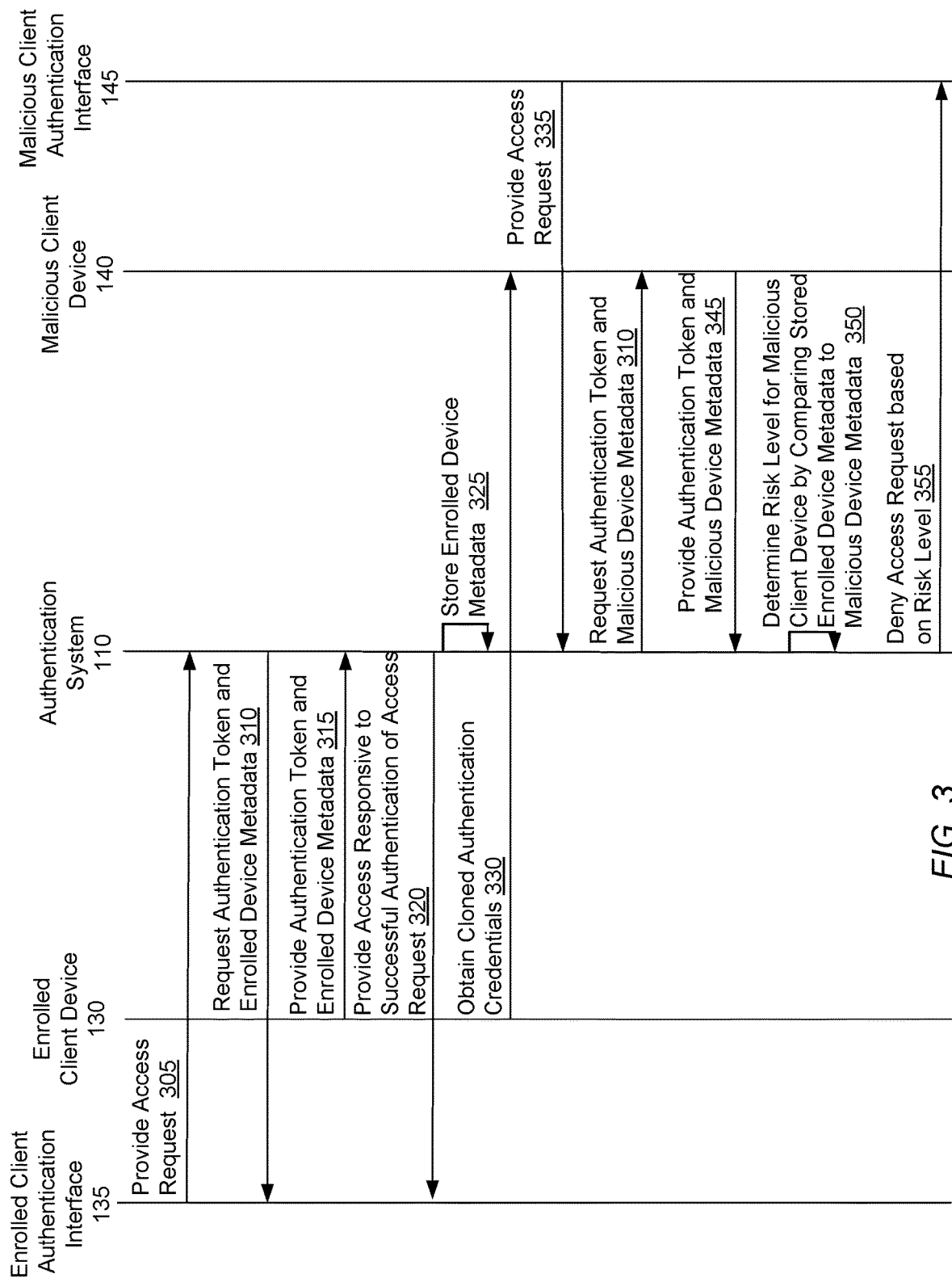
FIG. 3 is a sequence diagram illustrating interactions between an authentication system, an enrolled client device, an enrolled client authentication interface, a malicious client device, and a malicious client authentication interface to determine a risk level for the malicious client device, according to one embodiment.

FIG. 3 is a sequence diagram illustrating an embodiment of interactions between the authentication system 110, the enrolled client device 130, the enrolled client authentication interface 135, and the malicious client authentication interface 145 to authenticate access requests, while a malicious client device 140 also attempts to gain access.

The sequence of interactions depicted in FIG. 3 begins with the enrolled client interface 135 providing 305 an access request to the authentication system 110 for access to services of the service provider 120. For example, a user of the service provider 120 may be attempting to login to the service provider 120 via the enrolled client interface 335. Based on the access request from the enrolled client interface 335, the authentication system 110 requests 310 an authentication token and device metadata from the enrolled client device 130. For example, the authentication module 210 may request an authentication token (e.g., an MFA token) from the enrolled client device 130 signed using an authentication key (e.g., a secret MFA key). The enrolled client device 130 provides 315 an authentication token and device metadata to the authentication system 110, where the enrolled client device 130 generates the authentication token using authentication credentials of the enrolled client device 130. For example, the enrolled client device 130 may provide device metadata in a payload of the authentication token signed using an authentication key. Responsive to successfully authenticating the access request received from the enrolled client device 130 based on the authentication token, the authentication system provides 320 the enrolled client interface 335 access to the requested services. The authentication system 110 additionally stores 325 the device metadata for the enrolled client device 130 for future risk level determinations. For instance, the risk level module 220 may store the device metadata for the enrolled client device 130 in the device metadata store 240 after successfully authenticating the access request received from the enrolled client device 130.

In the example of FIG. 3, the malicious client device 140 somehow obtains 330 cloned authentication credentials of the enrolled client device 130 with the purpose of using them to obtain authentication from the authentication system 110. At some time after the authentication system 110 stores the device metadata for the enrolled client device 130, the malicious client interface 145 provides 335 an access request to the authentication system 110 for access to services. As with interaction 310, the authentication system 110 requests 340 an authentication token and device metadata from the malicious client device 140 based on the access request received from the malicious client interface 145. The malicious client device 140 provides 345 an authentication token and device metadata to the authentication system 110, where the malicious client device 140 generates the authentication token using the cloned authentication credentials. After receiving the device metadata from the malicious client device 140, the authentication system 110 determines a risk level for the malicious client device 140 by comparing 350 the stored device metadata for the enrolled client device 130 to the device metadata for the malicious client device 140. In particular, the authentication system 110 determines whether there are device metadata anomalies based on the comparison. For example, the risk level module 220 may determine that there is a discrepancy between the metadata for the enrolled client device 130 and the malicious client device 140 for one or more types of device metadata (e.g., operating system version, applications installed on the device, etc.), and determine the risk level based on the discrepancy. Based on the risk level, the authentication system 110 denies 355 the access rests provided by the malicious client interface 145. For instance, the authentication module 210 may determine the risk level exceeds a risk level threshold defined in an authentication policy associated with the service provider 120.

Figure 4:
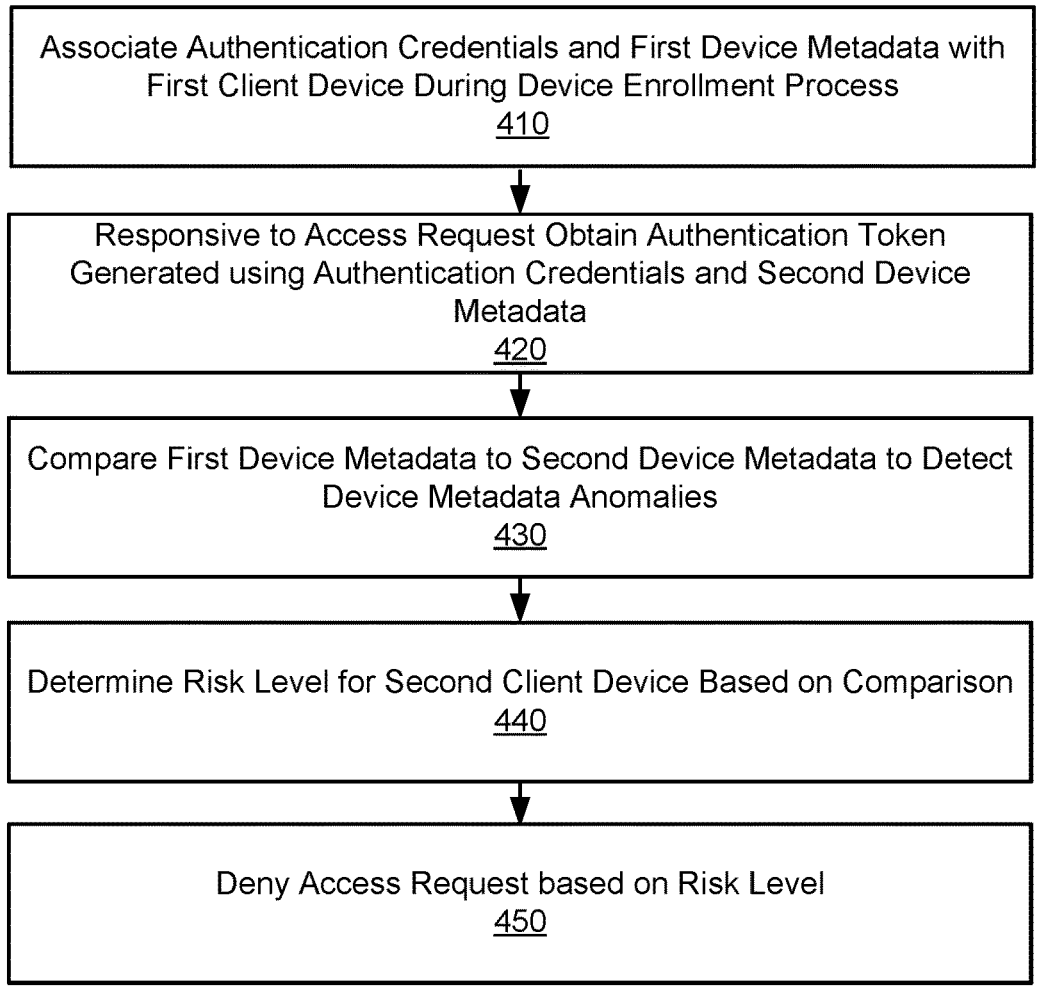
FIG. 4 is a flowchart illustrating a process for determining a risk level for a client device impersonating an enrolled client device, according to one embodiment.

FIG. 4 is a flowchart illustrating an embodiment of a process 400 for determining a risk level for a client device impersonating an enrolled client device. In the embodiment shown, the steps of FIG. 4 are illustrated from the perspective of the authentication system 110 performing the method 400.

In the embodiment shown in FIG. 4, the process 400 begins with the authentication system 110 associating 410 authentication credentials and device metadata with a first client device during a device enrollment process. For instance, the authentication module 210 may provide authentication credentials (e.g., an MFA secret key) and device metadata as part of enrolling the first client device in authentication services. At some time after enrolling the first client device, in response to an access request associated with a second client device impersonating the first client device, the authentication system 110 obtains 420 an authentication token generated by the second client device using the authentication credentials and including second device metadata describing one or more infrequently changing characteristics of the second client device. For example, the second client device may have cloned the authentication credentials from the first client device and used the authentication credentials to generate the authentication token in order to impersonate the first client device for authentication by the authentication system 110. The authentication system 110 compares 430 the stored first metadata to the second metadata in order to detect device metadata anomalies. Based on the comparison, the authentication system 110 determines 440 a risk level for the second client device. In particular, the risk level indicates a likelihood the second client device is not the first client device. Based on the risk level, the authentication system 110 denies 450 the access request, such as based on the risk level exceeding a threshold (e.g., a numerical score or risk designation threshold).

As such, through the sequence of interactions depicted in FIG. 3, the process 400 depicted in FIG. 4, or performed by other processes described herein, the authentication system 110 denies access requests from client devices impersonating enrolled client devices through a comparison of device metadata. In particular, by comparing difficult-to-alter device metadata that is known to correspond to an enrolled client device to device metadata for a new access request, the authentication system 110 detects access requests from malicious client devices that may not be apparent from risk factors determined based on device information describing only the malicious client device, which are relied on by conventional systems. Furthermore, the authentication system 110 obtains device metadata in response to access requests, unlike conventional systems which exhibit lag times between authentication of access requests and receiving information for a client device that can be used to determine a risk level. determination of risk levels for client devices. Additionally, the authentication system 110 can use rule-based techniques to efficiently and accurately determine risk levels for client devices, rather than complex analysis of inherent risk factors that is more likely to result in false positives.

In other embodiments than those shown in FIG. 3 or FIG. 4, some or all of the steps may be performed by other entities or components. In addition, some embodiments may perform the steps in parallel, perform the steps in different orders, or perform different steps.

Exemplary Computer Architecture

Figure 5:
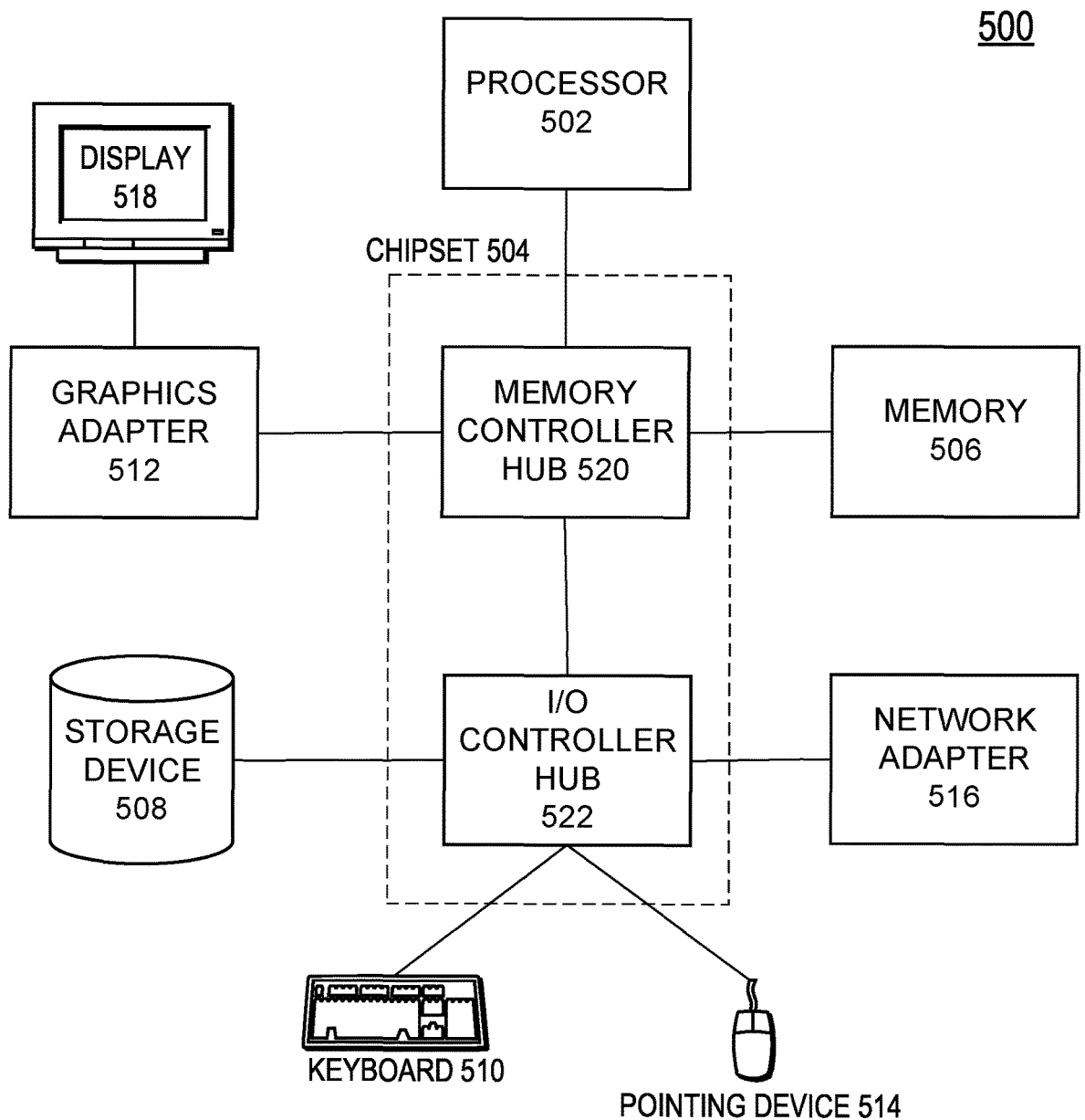
FIG. 5 is a high-level block diagram illustrating physical components of a computer used as part or all of the server, organization, client device of a user, or system providing the third-party application, according to one embodiment.

FIG. 5 is a block diagram illustrating physical components of a computer 500 used as part or all of authentication system 110, the service provider 120, the enrolled client device 130, or the malicious client device 140, in accordance with an embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500, such as a host or smartphone, may lack a graphics adapter 512, and/or display 518, as well as a keyboard 510 or external pointing device 514. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A non-transitory, computer-readable storage medium storing instructions that, when executed by a processor, perform actions comprising:
    associating, with an enrolled device during a device enrollment process, authentication credentials of the enrolled device and metadata of the enrolled device, wherein the metadata of the enrolled device comprises one or more infrequently changing characteristics of the enrolled device;
    obtaining, based on an access request received from a second device, an authentication token generated using the authentication credentials of the enrolled device and metadata of the second device;
    identifying, based on a comparison of the metadata of the enrolled device to the metadata of the second device, one or more metadata anomalies, wherein a metadata anomaly corresponds to a discrepancy between a device metadata value in the metadata of the enrolled device and a device metadata value in the metadata of the second device;
    determining, based on the one or more metadata anomalies, a risk level associated with the second device; and
    denying, based on determining that the authentication token is valid, based on the comparison of the metadata of the enrolled device to the metadata of the second device, and based on the risk level associated with the second device, the access request received from the second device.

2. The non-transitory, computer-readable storage medium of claim 1, wherein denying the access request is further based on determining, based on the comparison, that the second device is likely impersonating the enrolled device.

3. The non-transitory, computer-readable storage medium of claim 1, wherein the metadata of the enrolled device or the metadata of the second device comprises one or more of: an operating system (OS) version, a screen size, a processor count, a model, a manufacturer, a serial number, an international mobile equipment identity (IMEI), a cellular radio type, a subscriber identity module (SIM) card identifier, a disk capacity, a physical memory capacity, or a user interface type.

4. The non-transitory, computer-readable storage medium of claim 1, wherein the authentication token is signed using a cloned copy of an authentication key included in the authentication credentials of the enrolled device.

5. The non-transitory, computer-readable storage medium of claim 1, wherein the authentication token comprises a one-time password or a multi-factor (MFA) authentication token generated using the authentication credentials of the enrolled device.

6. The non-transitory, computer-readable storage medium of claim 1, wherein the actions further comprise:
    obtaining, based on an access request received from a third device, a second authentication token generated using the authentication credentials of the enrolled device and metadata of the third device; and
    authorizing, based on determining that the second authentication token is valid and based on a comparison of the metadata of the enrolled device to the metadata of the third device, the access request received from the third device.

7. The non-transitory, computer-readable storage medium of claim 6, wherein authorizing the access request received from the third device is further based on determining, based on the comparison, that the third device is likely the enrolled device.

8. A method comprising:
    associating, with an enrolled device during a device enrollment process, authentication credentials of the enrolled device and metadata of the enrolled device, wherein the metadata of the enrolled device comprises one or more infrequently changing characteristics of the enrolled device;
    obtaining, based on an access request received from a second device, an authentication token generated using the authentication credentials of the enrolled device and metadata of the second device;
    identifying, based on a comparison of the metadata of the enrolled device to the metadata of the second device, the access request received from the second device, one or more metadata anomalies, wherein a metadata anomaly corresponds to a discrepancy between a device metadata value in the metadata of the enrolled device and a device metadata value in the metadata of the second device;
    determining, based on the one or more metadata anomalies, a risk level associated with the second device; and
    denying, based on determining that the authentication token is valid, based on the comparison of the metadata of the enrolled device to the metadata of the second device, and based on the risk level associated with the second device, the access request received from the second device.

9. The method of claim 8, wherein the metadata of the enrolled device or the metadata of the second device comprises one or more of: an operating system (OS) version, a screen size, a processor count, a model, a manufacturer, a serial number, an international mobile equipment identity (IMEI), a cellular radio type, a subscriber identity module (SIM) card identifier, a disk capacity, a physical memory capacity, or a user interface type.

10. The method of claim 8, wherein the authentication token is signed using a cloned copy of an authentication key included in the authentication credentials of the enrolled device, and
wherein the authentication token comprises a one-time password or a multi-factor (MFA) authentication token generated using the authentication credentials of the enrolled device.

11. The method of claim 8, wherein denying the access request is further based on determining, based on the comparison, that the second device is likely impersonating the enrolled device.

12. The method of claim 8, further comprising:
obtaining, based on an access request received from a third device, a second authentication token generated using the authentication credentials of the enrolled device and metadata of the third device; and
authorizing, based on determining that the second authentication token is valid and based on a comparison of the metadata of the enrolled device to the metadata of the third device, the access request received from the third device.

13. The method of claim 12, wherein authorizing the access request received from the third device is further based on determining, based on the comparison, that the third device is likely the enrolled device.

14. An authentication system comprising:
a processor; and
memory storing instructions that, when executed by the processor, cause the authentication system to:
associate, with an enrolled device during a device enrollment process, authentication credentials of the enrolled device and metadata of the enrolled device, wherein the metadata of the enrolled device comprises one or more infrequently changing characteristics of the enrolled device;
obtain, based on an access request received from a second device, an authentication token generated using the authentication credentials of the enrolled device and metadata of the second device;
identify, based on a comparison of the metadata of the enrolled device to the metadata of the second device, one or more metadata anomalies, wherein a metadata anomaly corresponds to a discrepancy between a device metadata value in the metadata of the enrolled device and a device metadata value in the metadata of the second device;
determine, based on the one or more metadata anomalies, a risk level associated with the second device; and
deny, based on a determination that the authentication token is valid, based on the comparison of the metadata of the enrolled device to the metadata of the second device, and based on the risk level associated with the second device, the access request received from the second device.

15. The authentication system of claim 14, wherein to deny the access request, the instructions, when executed by the processor, cause the authentication system to:
determine, based on the comparison, that the second device is likely impersonating the enrolled device.

16. The authentication system of claim 14, wherein the metadata of the enrolled device or the metadata of the second device comprises one or more of: an operating system (OS) version, a screen size, a processor count, a model, a manufacturer, a serial number, an international mobile equipment identity (IMEI), a cellular radio type, a subscriber identity module (SIM) card identifier, a disk capacity, a physical memory capacity, or a user interface type.

17. The authentication system of claim 14, wherein the authentication token is signed using a cloned copy of an authentication key included in the authentication credentials of the enrolled device.

18. The authentication system of claim 14, wherein the authentication token comprises a one-time password or a multi-factor (MFA) authentication token generated using the authentication credentials of the enrolled device.

19. The authentication system of claim 14, wherein the instructions, when executed by the processor, further cause the authentication system to:
obtain, based on an access request received from a third device, a second authentication token generated using the authentication credentials of the enrolled device and metadata of the third device; and
authorize, based on a determination that the second authentication token is valid and based on a comparison of the metadata of the enrolled device to the metadata of the third device, the access request received from the third device.

20. The authentication system of claim 19, wherein to authorize the access request received from the third device, the instructions, when executed by the processor, cause the authentication system to:
determine, based on the comparison, that the third device is likely the enrolled device.

* * * * *